United States Patent [19]
Daijogo et al.

[11] Patent Number: 5,738,426
[45] Date of Patent: Apr. 14, 1998

[54] PROJECTION TYPE DISPLAY APPARATUS AND MULTI-VISION PROJECTION TYPE DISPLAY APPARATUS

[75] Inventors: Akira Daijogo; Shinji Okamori; Hiroshi Kida; Shinsuke Shikama, all of Tokyo, Japan

[73] Assignee: Mitsubishi Denki Kabushiki Kaisha, Tokyo, Japan

[21] Appl. No.: 759,634

[22] Filed: Dec. 5, 1996

[30] Foreign Application Priority Data

Dec. 8, 1995 [JP] Japan .................................. 7-320535

[51] Int. Cl.$^6$ .................................................. G03B 21/14
[52] U.S. Cl. ........................ 353/31; 353/20; 353/34
[58] Field of Search .............................. 353/20, 31, 33, 353/34, 37, 101; 348/752, 751, 757, 762; 349/5, 9

[56] References Cited

U.S. PATENT DOCUMENTS

| | | | |
|---|---|---|---|
| 5,164,821 | 11/1992 | Tanaka et al. | 348/762 |
| 5,267,029 | 11/1993 | Kurematsu et al. | 348/751 |
| 5,374,968 | 12/1994 | Haven et al. | 353/31 |
| 5,541,673 | 7/1996 | Shioya et al. | 353/20 |
| 5,575,548 | 11/1996 | Lee | 353/31 |

FOREIGN PATENT DOCUMENTS 5127141  5/1993  Japan .

*Primary Examiner*—William Dowling

[57] ABSTRACT

A projection type display apparatus includes a light source, color separator, half-wave plate, a plurality of light valves, color synthesizer, and projection lens. The light source emits a substantially parallel illumination flux. The color separator separates the light emitted from the light source into light of three colors including red, green, and blue. The light of the respective color passes through the corresponding half-wave plate which is placed in the light path of the light and causes the plane of vibration of the light to rotate through a predetermined angle. Then, the light of each color exiting the half-wave plate passe through the corresponding light valve, being modulated into a color image. The color synthesizer synthesizes the color images into a single full-color image and the projection lens enlarges and projects the single full-color image formed.

20 Claims, 21 Drawing Sheets

PROJECTION TYPE DISPLAY APPARATUS AND MULTI-VISION PROJECTION TYPE DISPLAY APPARATUS

BACKGROUND OF THE INVENTION

1. Technical Field of the Invention

The present invention relates to a projection type display apparatus where images formed on a plurality of light valves are synthesized into a composite image, enlarged, and projected on a screen. The present invention also relates to a multi-vision projection type display apparatus where a plurality of the aforementioned projection type display apparatuses are arranged into a large composite screen.

2. Description of Related Art

Projection type display apparatuses have been put into practice where a luminous flux emitted from a light source is separated into three primary colors, i.e., red, green, and blue, light of the respective color is then incident upon the corresponding liquid crystal light valve which modulates the luminous flux into a monochromatic image, and the monochromatic images are then synthesized into a combined full color image which is subsequently enlarged and projected on the screen.

FIG. 24 illustrates an optical system for a projection type display apparatus using conventional light valves.

The light source 1 includes a lamp 2 and reflecting mirror 3 and emits a luminous flux 100. The lamp 2 is a white-light lamp and takes the form of, for example, a metal halide lamp, xenon lamp, or halogen lamp. The reflecting mirror 3 typically has a parabolic surface. The luminous flux 100 can be substantially parallel when the center of the light emitting element of the lamp 2 is positioned at the focal point of the parabolic surface. The luminous flux 100 passes through the filter 4. The filter 4 extracts only visible light components from the luminous flux 100, thereby preventing ultraviolet rays and infrared rays from deteriorating the optical property of the liquid crystal light valve 7.

The visible light components are then directed to a first dichroic mirror 5a which passes the red light therethrough and reflects green and blue lights. The green and blue lights are then directed to a second dichroic mirror 5b which passes the blue light and reflects the green light. In this manner, the luminous flux 100 is separated into three monochromatic lights, i.e., red light 100R, green light 100G, and blue light 100B. The lights of respective colors are reflected by reflecting mirrors 6a, 6b, and 6c toward the corresponding liquid crystal light valves 7R, 7G, and 7B, respectively. Each of the liquid crystal light valves is illuminated by the light of the corresponding color and modulates the light passing therethrough. The modulated luminous flux are then incident on a known dichroic prism 8, which reflects red and blue lights and passes green light. The dichroic prism 8 combines the light of colors into a full color image: The full color image is then incident upon a projection lens 9 which enlarges and projects the projection light 101 onto a screen 10 for viewing.

The construction and operation of the liquid light valve 7 will be described.

One practical example of a liquid crystal light valve 7 is a liquid crystal display element using a twisted nematic (TN) type liquid crystal. FIGS. 25A–25B show the operation and construction of a TN type liquid crystal light valve. Referring to FIG. 25A, the light valve 7 includes the liquid crystal cells 72 sandwiched between two glass substrates 74a and 74b on which polarizers 71 and 73 are formed. The polarizers 71 and 73 are each formed on the surface of the glass substrates 74a and 74b remote from the liquid crystal cells 72. The polarizers 71 and 73 are oriented so that their polarization axes are perpendicular to each other. When no voltage is applied to the light valve as shown in FIG. 25A, the linearly polarized light 100a is rotated by 90° due to the rotatory polarization of the liquid crystal cell 72 as the polarized light passes through the liquid crystal cells 72, and then passes as a transmitted light 100b through the polarizer 73.

When a voltage higher than a threshold voltage Vth is applied as shown in FIG. 25B, the rotatory polarization decreases so that the quantity of light passing through the polarizer 73 decreases with increasing voltage. Thus, the transmittance of the light valve 7 can be controllably driven by applying control voltages through electrodes arranged in two-dimension array form, thereby implementing a two-dimensional display element.

With the aforementioned conventional projection type display apparatus, the following problem is encountered by the illumination system (particularly light source system) and color separating system which determines the hue of the projected light.

Referring to FIG. 24, the dichroic mirrors are used as a color separator and the dichroic prism as a color synthesizer.

Dichroic mirrors and dichroic prisms are of the construction where transparent dielectric films having a thickness of about light wavelength is laminated on the surface of the transparent substrate or prisms.

Dichroic mirrors and dichroic prisms are almost free from optical absorption and serve to separate light at a wavelength determined by the laminated film construction, the light being separated into transmitted wavelengths and reflected wavelengths by virtue of optical multiple interference.

As the incidence angle θ increases from 0°, the spectral property of such a multilayer of optical film becomes different for P-polarization having the plane of vibration parallel to the plane of incidence and for S-polarization having the plane of vibration perpendicular to the plane of incidence.

Thus, the hue of a projected image varies depending on the cone angle of the linearly-polarized light incident upon the the multilayer of optical film, and linearly polarized light which is P-polarized or S-polarized is commonly used.

The spectral property of dichroic mirrors and dichroic prisms are controlled by adjusting the thickness of the coating applied on the surface of the mirrors and prisms, the thickness being in the range of wavelengths of light. The variations in the thickness of coating occur during the manufacture of the mirrors and prisms, causing their spectral properties to shift to shorter-wavelength side or longer-wavelength side. This shift in spectral property is said to be in the range of about 5 to 7 nm in terms of wavelength. The variations in spectral property cause the chromaticity of a projected image to deviate from the desired level.

Metal halide lamps used as a light source contain many kinds of metal additives sealed therein and therefore the emitted spectrum varies depending on the vapor pressure of the sealed metal additives. The vapor pressure is determined by the shape, temperature, and the amount of sealed metal. Therefore, the vapor pressure is a source of variations in emitted spectrum of the lamp, leading to changes in emitted spectrum even when the lamp is emitting light. The variations in emitted spectrum therefore causes the chromaticity of a projected image to deviate from a desired chromaticity, the chromaticity of projected image being different from lamp to lamp.

With a projection type display apparatus where a plurality of images are combined into a large, composite image, prominent variations in color will appear in the projected light due to variations in the characteristics of the light sources, dichroic mirrors and dichroic prisms incorporated in the projectors. These variations cause prominently deteriorated image quality.

As mentioned above, the problem with the conventional display apparatus is that the chromaticity of the projected image deviates from the desired chromaticity and the chromaticity changes with time if there are variations in the spectrum emitted from the light source and variations in the thickness of the optical multi-layer film coated on the dichroic mirror and dichroic prism.

SUMMARY OF THE INVENTION

The present invention was made to solve the aforementioned drawbacks of the prior art display apparatus.

A first object of the invention is to provide a projection type display apparatus which is capable of compensating for variations in the spectral properties of the dichroic mirror, dichroic prism and light source, thereby improving the reproducibility of the original colors in the projected light.

This object is achieved by placing a half-wave plate in at least one light path so that the half-wave plate causes the polarization of the partially polarized illumination light to vary, thereby changing the spectral characteristics of the light of a primary color.

A second object of the invention is to provide a projection type display apparatus where the spectral property of the dichroic mirror or dichroic prism is varied by optical means, thereby controllably adjusting the reproducibility to provide excellent color reproducibility of the projected light.

This object is achieved by rotating the half-wave plate about an axis passing through and normal to the surface of the half-wave plate so as to vary the polarization of the partially polarized illumination light passing through the half-wave plate, thereby changing the color reproducibility of the projected image.

A third object of the invention is to provide a projection type display apparatus where colors are always reproduced with the same reproducibility.

This object is achieved by providing a chromaticity detector which detects the chromaticity of the image projected on the screen, thereby automatically detecting the changes in spectral property occurring over time to always maintain the same color reproducibility of the projected image.

A fourth object of the invention is to provide a projection type display apparatus using a plurality of projectors which are capable of compensating for variations in the spectral property of the dichroic mirror, dichroic prism, and light source, thereby efficiently eliminating difference in the color reproducibility of the projected light among the projectors.

This object is achieved by placing a half-wave plate in the respective projector so as to change the spectrum projected from the respective projector, thereby eliminating difference in color among the projectors due to variations in lamp spectrum among lamps and variations in spectral property among dichroic mirrors and dichroic prisms.

A fifth object of the invention is to provide a projection type display apparatus using a plurality of projectors where the spectral property of the dichroic mirror or dichroic prism of the respective projector is varied by optical means, thereby controllably changing the color reproducibility of the respective projected light.

This object is achieved by rotating the half-wave plate in the respective projector about an axis passing through and normal to the surface of the half-wave plate to vary the polarization of the partially polarized illumination light of the respective projector, thereby changing the color reproducibility of the projected image while minimizing difference in color among projectors.

A sixth object of the invention is to provide a projection type display apparatus using a plurality of projectors where the same reproducibility of color in the projected light outputted from the respective projector is always maintained.

This object is achieved by providing a chromaticity detector which detects the chromaticity of the image projected on the respective screen segment, thereby automatically detecting the changes in spectral property occurring over time to maintain the same color reproducibility of the projected image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be described in detail with reference to the drawings.

First embodiment

Figure 1:
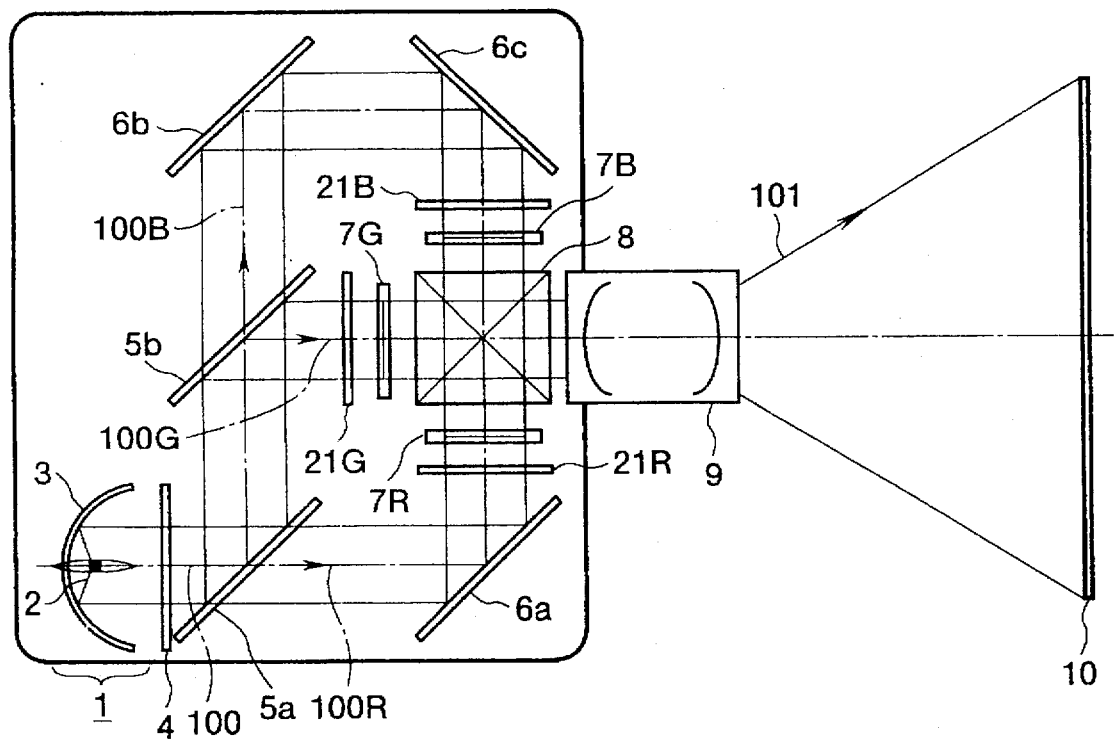
FIG. 1 illustrates a general construction of an optical system of a projection type display apparatus according to a first embodiment.

FIG. 1 illustrates a general construction of an optical system of a projection type display apparatus according to a first embodiment of the invention. Referring to FIG. 1, the light source device 1 includes a light source 11 and a concave reflecting mirror 3.

Figure 2:
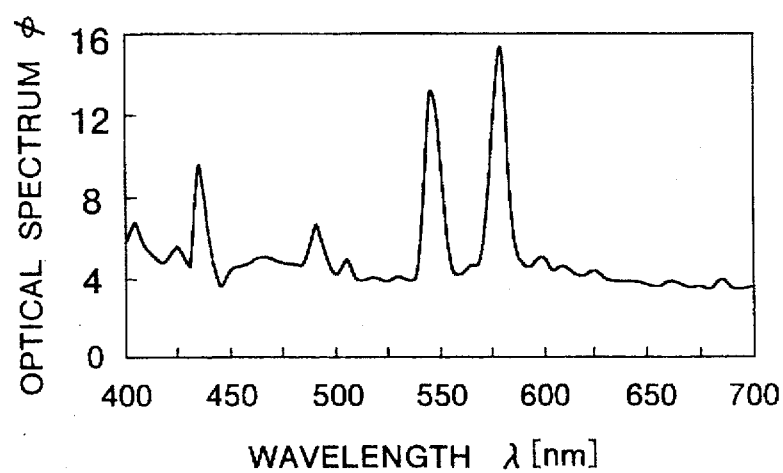
FIG. 2 illustrates, by way of example, the spectral property of a metal halide lamp.

The light source 11 is a high voltage discharge lamp such as a metal halide lamp, xenon lamp, or halogen lamp which emits white light. FIG. 2 illustrates, by way of example, the spectral property of a metal halide lamp. The reflecting mirror 3 takes the form of a well-known parabolic mirror having a focal point in the vicinity of the light emitting portion of the lamp 2. A coating may be applied to the reflecting surface of the parabolic mirror 3 as required, so that wavelengths longer than, for example, 700 nm pass through the coating and therefore a smaller amount of the heat generated by the lamp 2 is radiated to the liquid crystal light valve. The luminous flux emitted from the lamp 2 and reflected by the parabolic reflecting mirror 3 is a substantially parallel luminous flux 100 and is incident upon the filter 4. The filter 4 passes only visible light (e.g., wavelengths in the range of 400–700 nm) and reflects or absorbs unwanted infrared rays and ultraviolet rays.

The luminous flux 100 passing through the filter 4 is incident upon a first dichroic mirror 5a which reflects green light 100G and blue light 100B and passes red light 100R. The red light 100R is reflected by the reflecting mirror 6a and passes through a half-wave plate 21R to illuminate a liquid crystal light valve 7R. The green light 100G and blue light 100B reflected by the first dichroic mirror 5a are incident upon a second dichroic mirror 5b. The dichroic mirror 5b reflects the green light 100G and passes the blue light 100B. The green light 100G illuminates the liquid crystal light valve 7G through a half-wave plate 21G. The blue light 100B passing through the second dichroic mirror 5b is reflected by two reflecting mirrors 6b and 6c and illuminates a liquid crystal light valve 7B through a half-wave plate 21B.

The liquid crystal light valves 7R, 7G, and 7B modulate the luminous flux 100R, 100G, and 100B, respectively, which are then combined into a single full-color luminous flux by a known dichroic prism 8, which reflects blue and red lights and passes green light. The combined luminous flux exiting the dichroic prism 8 is incident upon a projection lens 9 which in turn enlarges the combined luminous flux and projects as a projection light 101 onto a screen 10 for viewing.

Figure 3:
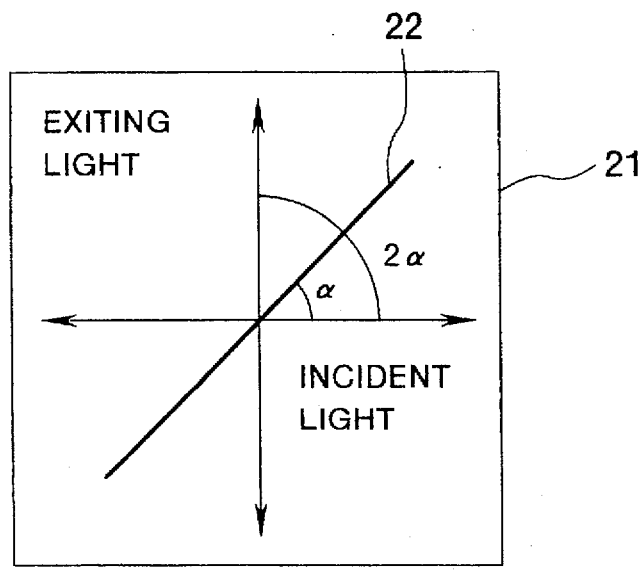
FIG. 3 illustrates the operation of the half-wave plate used in the first embodiment.

The principle of the half-wave plate 21 will be described. FIG. 3 illustrates the operation of the half-wave plate 21 used in the first embodiment, and shows the relationship between the optic axis 22 of the half-wave plate 21, light incident on the half-wave plate, and light exiting the half-wave plate 21. Most natural light is a randomly polarized light. If natural light is incident on the half-wave plate 21, i.e., normal to the page so that the direction of vibration of the incident light makes an angle α with the plane including the optic axis 22 of the half-wave plate 21, then the exiting light is polarized at 2 α with the result that the planes of vibration of the incident light and the exiting light are symmetrical with respect to the plane including the optic axis 22 of the half-wave plate 21. For example, if the P-polarized plane of vibration and the S-polarized plane of vibration of the incident light are at α=45° with respect to the plane including the optic axis 22 of the half-wave plate, respectively, then the P-polarized component of the incident light is rotated by 90° and exits as an S-polarized component while the S-polarized component of the incident light is rotated by 90° and exits as a P-polarized component.

Figure 4:
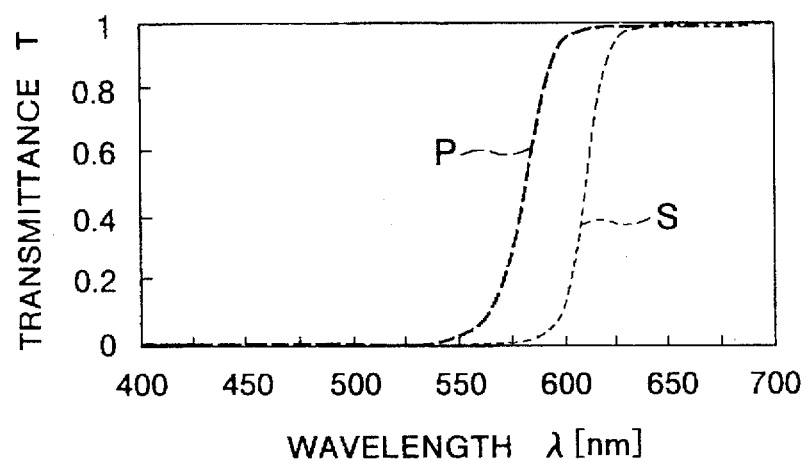
FIG. 4 illustrates the spectral transmission characteristic of the dichroic mirror, which passes red light, used in the first embodiment.
Figure 5:
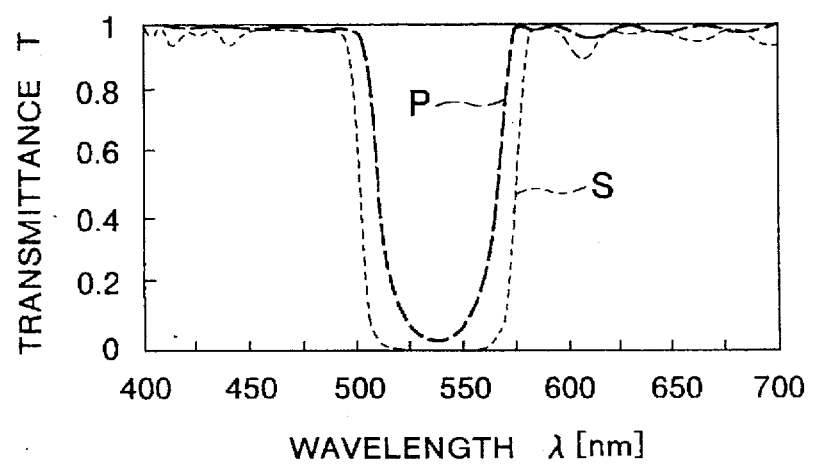
FIG. 5 illustrates the spectral transmission characteristic of the dichroic mirror, which reflects green light, used in the first embodiment.
Figure 6A:
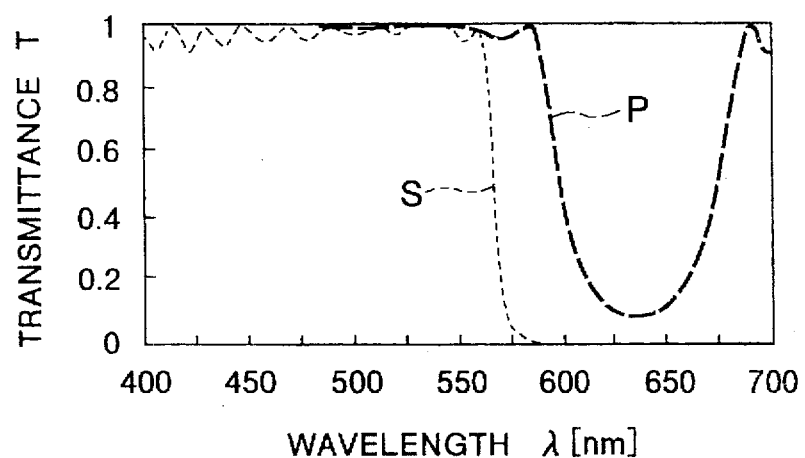
FIGS. 6A and 6B illustrate the spectral transmission characteristic of the dichroic prism in the first embodiment.
Figure 6B:
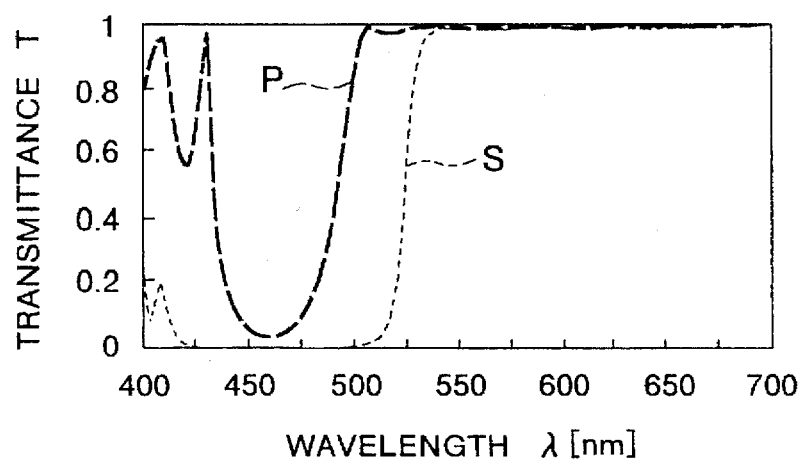

Next, the spectral property of the color separating system and color synthesizing system placed in the optical paths of light of single colors, i.e., red (R), green (G), and blue (B) will be described as follows:

FIG. 4 illustrates the spectral transmission characteristic of the dichroic mirror used in the first embodiment, which passes red light. FIG. 5 illustrates the spectral transmission characteristic of the dichroic mirror used in the first embodiment, which reflects green light. FIGS. 6A and 6B illustrate the spectral transmission characteristic of the dichroic prism in the first embodiment. Referring to FIGS. 4, 5, and 6A–6B, dashed lines P indicate the spectral transmission characteristic of the P-polarized light and doted lines S indicate the spectral transmission characteristic of the S-polarized light.

Figure 7:
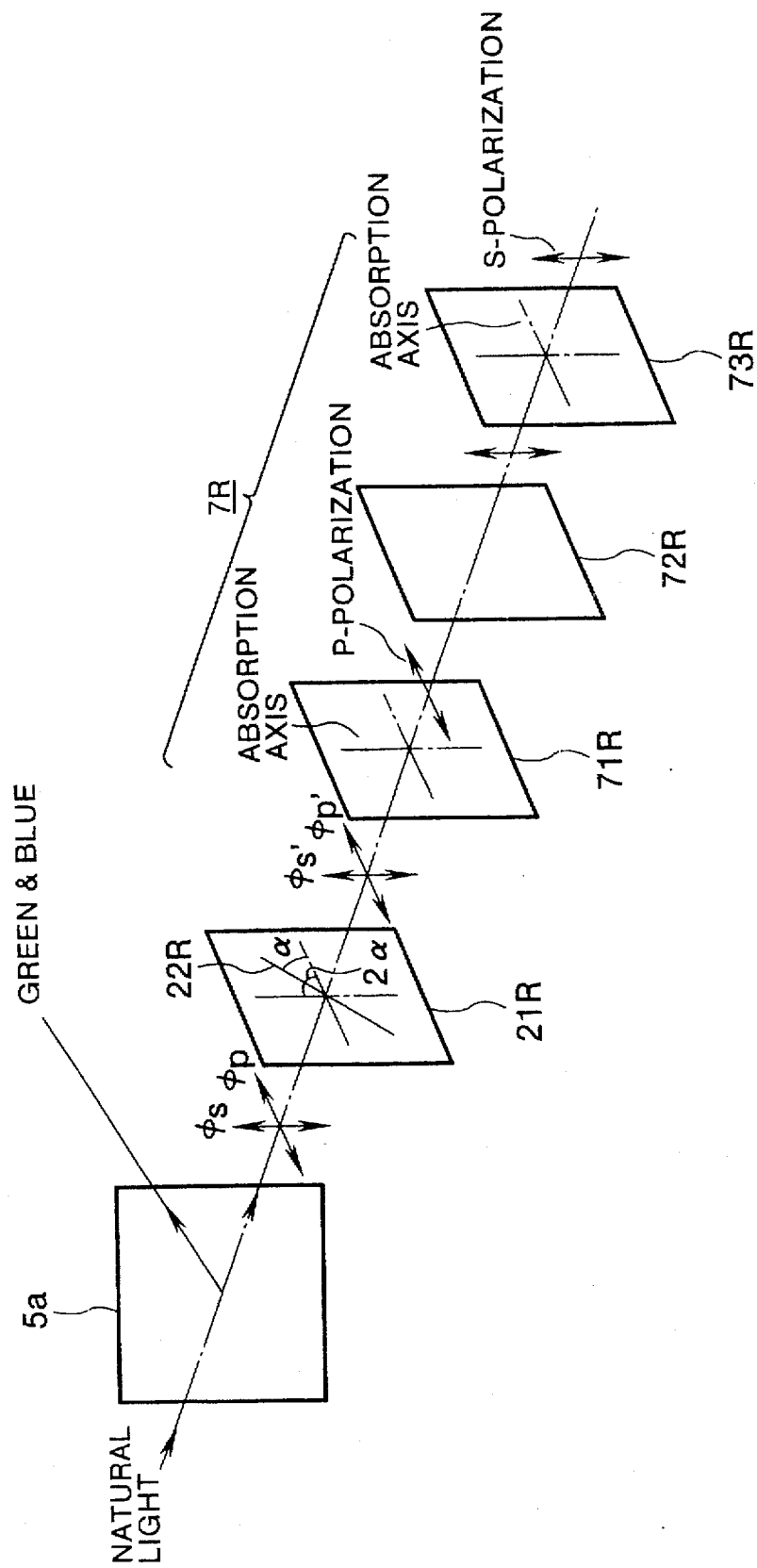
FIG. 7 illustrates the directions of polarization in the optical path of red light in the first embodiment.
Figure 25A:
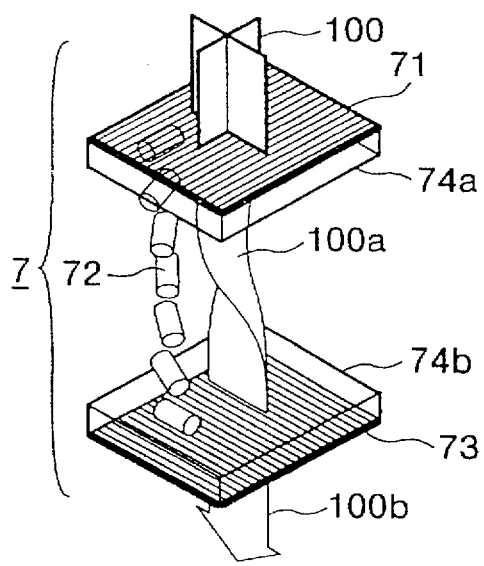
FIGS. 25A–25B show the construction and operation of a TN type liquid crystal light valve.
Figure 25B:
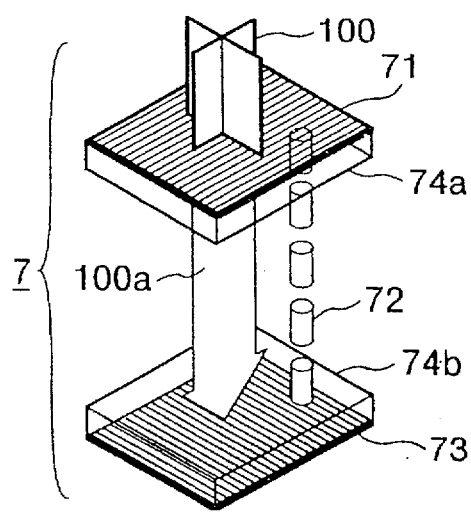

FIG. 7 illustrates the directions of polarization in the optical path of red light in the first embodiment. The incident side polarizer 71R is oriented so that the direction of absorption axis is 90° (transmission axis is 0°), i.e., the P-polarization is used for the incident light. The exiting side polarizer 73R is oriented so that the direction of absorption axis is 0° (transmission axis is 90°), i.e., the S-polarization is used for the exiting light. When the light passes through the liquid crystal 72R, the light is rotated by 90° as shown in FIG. 25A.

When the half-wave plate 21R is arranged in such a way that the plane of vibration of the P-polarization makes an angle α=0° with the plane including the optic axis 22R of the half wavelength 21R, i.e., the plane of vibration coincides with the plane including the optic axis 22R, no phase difference results and therefore the half-wave plate 21R does not serve as a phase plate. Thus, the spectral components produced by the spectral transmission characteristic of the first dichroic mirror 5a that act on the P-polarized component, passes through the incident side polarizer 71R to be modulated by the image formed in the liquid crystal light valve 7R.

Referring to FIG. 7, natural light passes through the first dichroic mirror 5a and exits as partially polarized light φ which has the P-polarized component and the S-polarized component in different proportion. Then, the partially polarized light φ is incident upon the half-wave plate 21R with the plane of vibration of the P-polarized light at an angle α=θ with the plane including the optic axis 22R of the half-wave plate 21R. The P-polarized component φ p and S-polarized component φ s of the partially polarized light φ are converted into a resultant partially polarized light having the P-polarized component φ p' and S-polarized φ s' as shown in FIG. 7 when they pass through the half-wave plate 21R. Thus, the resultant partially polarized light has a spectral component resulting from the spectral characteristic of the first dichroic mirror 5a that acts on the P-polarized component and a spectral component resulting from the spectral characteristic that acts on the S-polarized component, one component having lost more of it than the other. The produced spectral components φ p' and φ s' pass through the incident side polarizer 71R, liquid crystal cell 72R, and the exiting side polarizer 73R, forming a red image. As is clear from FIG. 4, the range of wavelength of the P-polarized component that passes the dichroic mirror 21R is wider than that of the S-polarized component. Therefore, if the angle α between the plane of vibration of the P-polarized light and the plane including the optic axis 22R is other than 0°, the range of spectral component of the light passing through the liquid light valve 7R is narrower, producing more saturated red light, i.e., better color purity.

In the path of the green light, the incident light is S-polarized, i.e., the direction of absorption axis of the incident side polarizer, not shown, is 0° (transmission axis is 90°), and the exiting light is P-polarized, i.e., the direction of absorption axis of the exiting side polarizer, not shown, is 90° (transmission axis is 0°). The half-wave plate 21G is placed in the light path in a similar manner to the half-wave plate 21R. Thus, the resultant light passing through the liquid crystal light valve 7G includes P- and S-polarized spectral components resulting from the spectral characteristics of the first and second dichroic mirrors 5a and 5b, the spectral characteristic of the respective dichroic mirror acting on both the P-polarized component and S-polarized component of the incident light. The resultant light has a proportion of the P- and S-polarized spectral components different from that of the incident light, one having lost more of it than the other. The resultant light passes through the liquid crystal light valve 7G to be modulated by the image formed in the liquid crystal light valve 7G. As is clear from FIGS. 4 and 5, the range of wavelength of the P-polarized component that passes through the dichroic mirror is wider than that of the S-polarized component. In other words, the S-polarized component is reflected in a wider range of wavelength than the P-polarized component. Therefore, if the angle α between the plane including the optic axis and the plane of vibration of the S-polarized component is other than α=0°, the range of spectral component of the light passing through the liquid crystal light valve 7G is narrower, producing more saturated green light, i.e., better color purity.

In the path of the blue light, the P-polarization is used for the incident light, i.e., the direction of absorption axis of the incident side polarizer, not shown, is 90° (transmission axis is 0°), and the S-polarization is used for the exiting light, i.e., the direction of absorption axis of the exiting side polarizer, not shown, is 0° (transmission axis is 90°). The half-wave plate 21B is placed in the light path in a similar manner to the half-wave plate 21R. The resultant light passing through the liquid crystal light valve 7B includes a spectral component resulting from the spectral characteristic of the second dichroic mirror 5b that acts on the P-polarized component, and a spectral component resulting from the spectral characteristic of the second dichroic mirror 5b that acts on the S-polarized component, one spectrum component having lost more of it than the other. The resultant light passes through the liquid crystal light valve 7B to be modulated by the image formed in the liquid crystal light valve 7B. As is clear from FIG. 5, the range of wavelength of the P-polarized component that passes the dichroic mirror is wider than that of the S-polarized component. Therefore, if the angles α between the plane including the optic axis and the plane of vibration of the P-polarized component is other than α=0°, the range of spectral component of the light passing through the liquid crystal light valve 7B is narrower, producing a more saturated blue light, i.e., better color purity.

As described above, the half-wave plate placed in a light path causes changes in the spectral characteristics of the P-polarized component and S-polarized component of the light transmitted through the half-wave plate, thereby allowing adjustment of the hue of the light that passes through the liquid crystal light valve. This allows adjustment of the chromaticity of the monochromatic lights R, G, and B of the projection light to a desired level.

Figure 8:
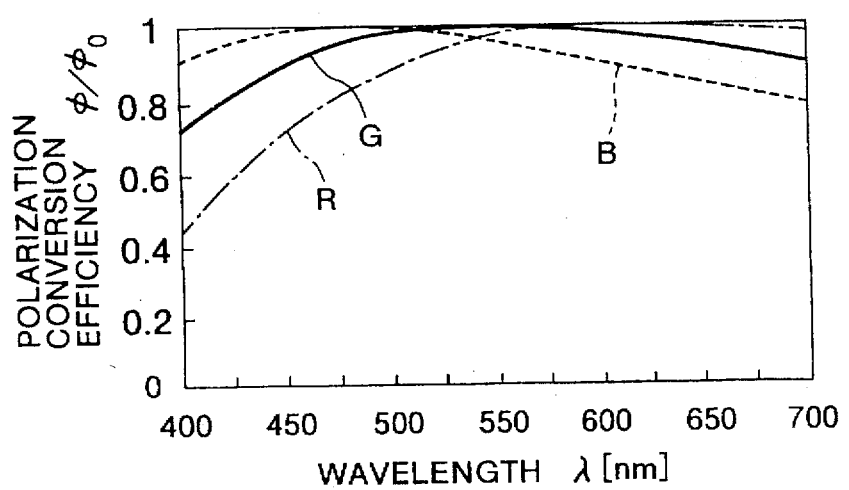
FIG. 8 shows the calculated results of the polarization conversion efficiency.

A half-wave plate does not cause the rotation of polarized light as shown in FIG. 8 at all wavelengths but result in different polarizations of light depending on the wavelength since the phase difference depends on the wavelength of the light passing through the half-wave plate. Component φ of the polarized light $φ_o$ incident on the half-wave plate is converted into a desired polarized light expressed by equations (1) and (2).

$$φ=φ_o \sin^2 δ \qquad (1)$$

where $δ=πR/λ$ $R=λ_o/2$ where R is the retardation of the half-wave plate, λ is a wavelength, and $λ_o$ is a designed mid wavelength. The phase difference Δ produced by the half-wave plate is given by the following equation.

$$Δ=2πR/λ \qquad (2)$$

In other words, the polarization conversion efficiency given by $φ/φ_o$ decreases as the wavelength λ deviates from 2R.

The luminous flux incident upon the respective half-wave plate is a monochromatic color light, i.e., one of the primary colors R, G, and B. Therefore, when the respective monochromatic color lights have mid wavelengths of 610, 540, and 470 nm, respectively, the polarization conversion efficiency $\phi/\phi_o$ can be minimized by setting the retardation of the half-wave plate for the respective light paths to 305, 270, and 235 nm, respectively. FIG. 8 shows the calculated results of the polarization conversion efficiency $\phi/\phi_o$. Any of the respective half-wave plates shows polarization conversion efficiencies higher than 95% at wavelengths ±50 nm away from its mid wavelength. This is practically sufficient.

A non-reflective coating in the form of a known dielectric multi-layer may be applied on the light incident surface and/or the light-exiting surface of the half-wave plate, as required. The thickness of the coating is in the rages of 600–700 nm for red, 500–600 nm for green, and 400–500 nm for blue. The multi-layer of thin film minimizes Fresnel reflection on the surface of the half-wave plate, thereby somewhat improving the transmittance of the half-wave plate. The light incident upon the half-wave plate and the light transmitted therethrough are substantially parallel light which eliminates any serious problems that variations in incidence angle result in changes in spectral characteristic.

In the present invention, the chromaticity of the primary colors R, G, and B of a projection light may be adjusted using the fact that the polarization of light depends on the spectral property of a dichroic mirror, and therefore the use of this fact offers a projection type display apparatus having good color reproducibility of the projected light.

Figure 9:
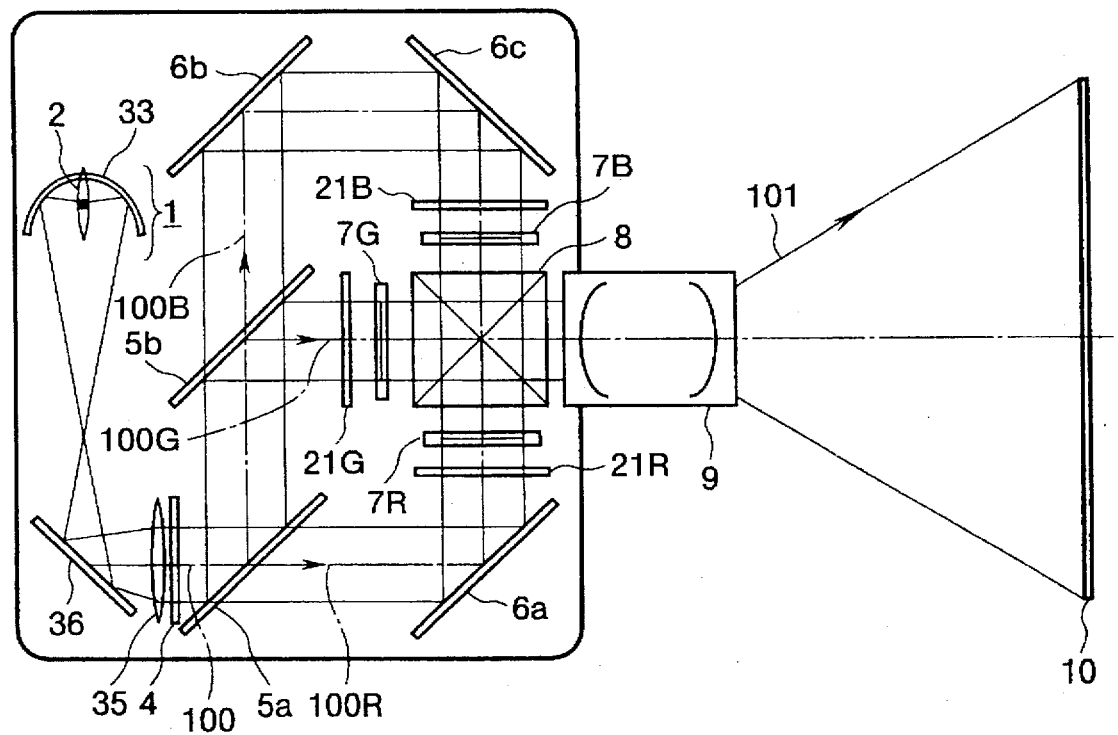
FIG. 9 shows an optical system in which a light source has a reflecting mirror in the form of an elliptical mirror 33.

While the reflecting mirror 3 takes the form of a parabolic mirror, the elliptical mirror 33 as shown in FIG. 9 may also be used.

Referring to FIG. 9, the mid point of the light emitting element of the lamp 2 is at the first focal point of the elliptical mirror 33, so that the luminous flux reflected by the elliptical mirror 33 is converged to an area close to the second focal point of the elliptical mirror 33, forming a secondary light source. A mirror 36 takes the form of a reflecting mirror or a cold mirror which passes infrared rays (wavelengths longer than 700 nm). The mirror 36 reflects the luminous flux emitted from the secondary light source to a collimator lens 35 having a focal length of f1. The collimator lens 35 is disposed at a distance f1 from the second focal point of the elliptical mirror 33, so that the luminous flux emitted from the secondary focal point is converted by the collimator lens 35 into a parallel illumination luminous flux 100.

Figure 10:
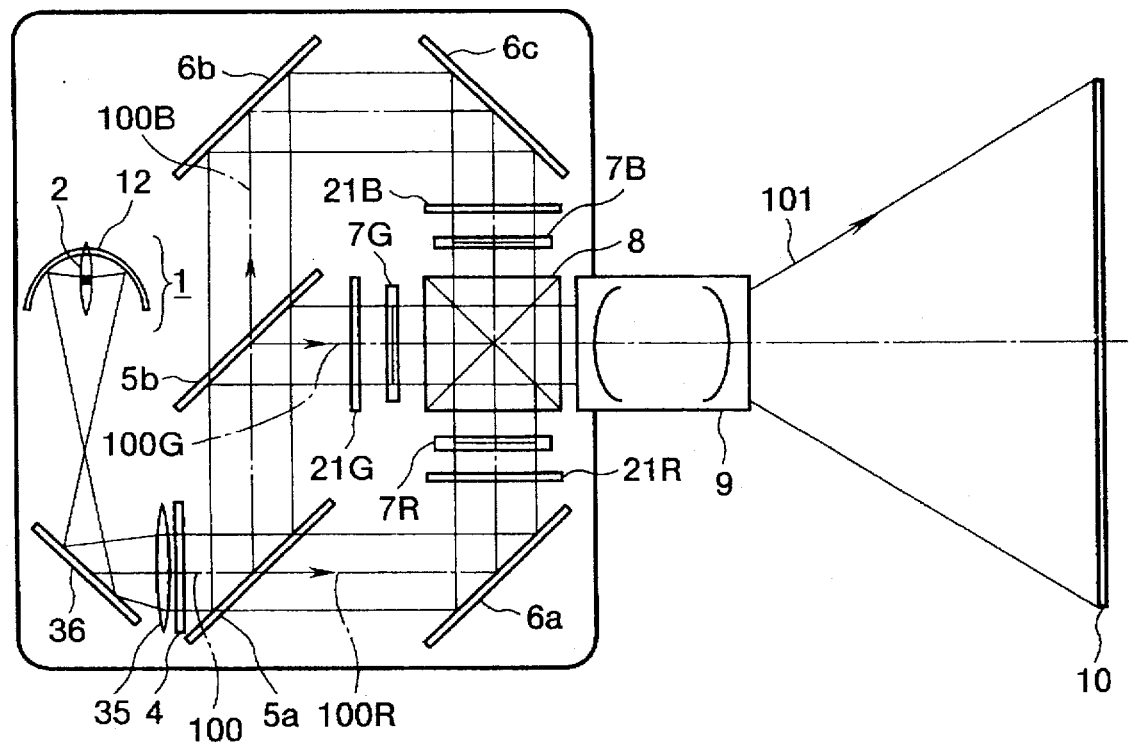
FIG. 10 illustrates an optical system in which the reflecting mirror is in the form of an OPR (Orthogonal Parabolic Reflector) 12.
Figure 11:
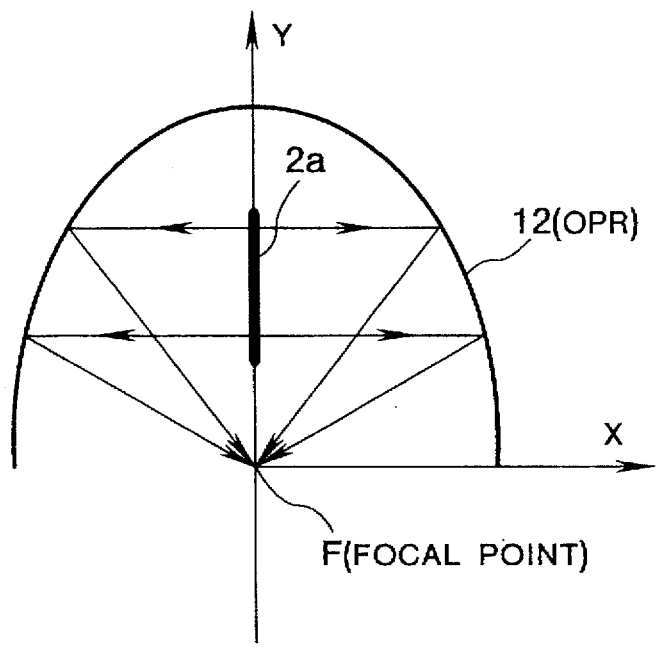
FIG. 11 illustrates the principle of the OPR.

FIG. 10 illustrates an optical system in which the reflecting mirror 3 is in the form of an OPR (Orthogonal Parabolic Reflector) as shown in FIG. 11. FIG. 11 illustrates the principle of the OPR. The reflecting surface of a conventional parabolic mirror is a curvature described by the rotation of a curve given by Equation (1) about the x-axis of the ordinary coordinate (x, y):

$$y^2 = 4fx \tag{1}$$

where f is a focal length.

The OPR shown in FIG. 11 has a curvature described by the rotation of a curve derived from Equations (4) and (5) about the Y-axis.

$$Y = 2\{f(f+X)\}^{1/2} \text{ where } -f \leq X \leq 0 \tag{4}$$

$$Y = 2\{f(f-X)\}^{1/2} \text{ where } 0 \leq X \leq f \tag{5}$$

The coordinate (X, Y) is an orthogonal coordinate obtained by shifting the orthogonal coordinate (x, y) of Equation (3) in the x-axis so that the origin of the coordinate (X, Y) is (f, 0) of the coordinate (x, y). A strip-shaped light emitting element 2a, e.g., discharge arc of a metal halide lamp lies on the Y-axis of the OPR 12. The OPR functions to efficiently converge the light, which is emitted by the light emitting element 2a in a direction perpendicular to the direction in which the strip-shaped light emitting element 2a extends, to a focal point F. In the present invention, the strip-shaped arc 2a of the discharge lamp 2 is preferably positioned on the Y-axis (rotation axis) of the OPR 12.

Referring to FIG. 9 again, the mirror 36 reflects the luminous flux emitted from the secondary light source to the collimator lens 35 having a focal length of f1. The collimator lens 35 is disposed at a distance f1 from the second focal point of the elliptical mirror 33, so that the luminous flux emitted from the secondary focal point is converted into a parallel illumination luminous flux 100.

Second embodiment

Figure 12:
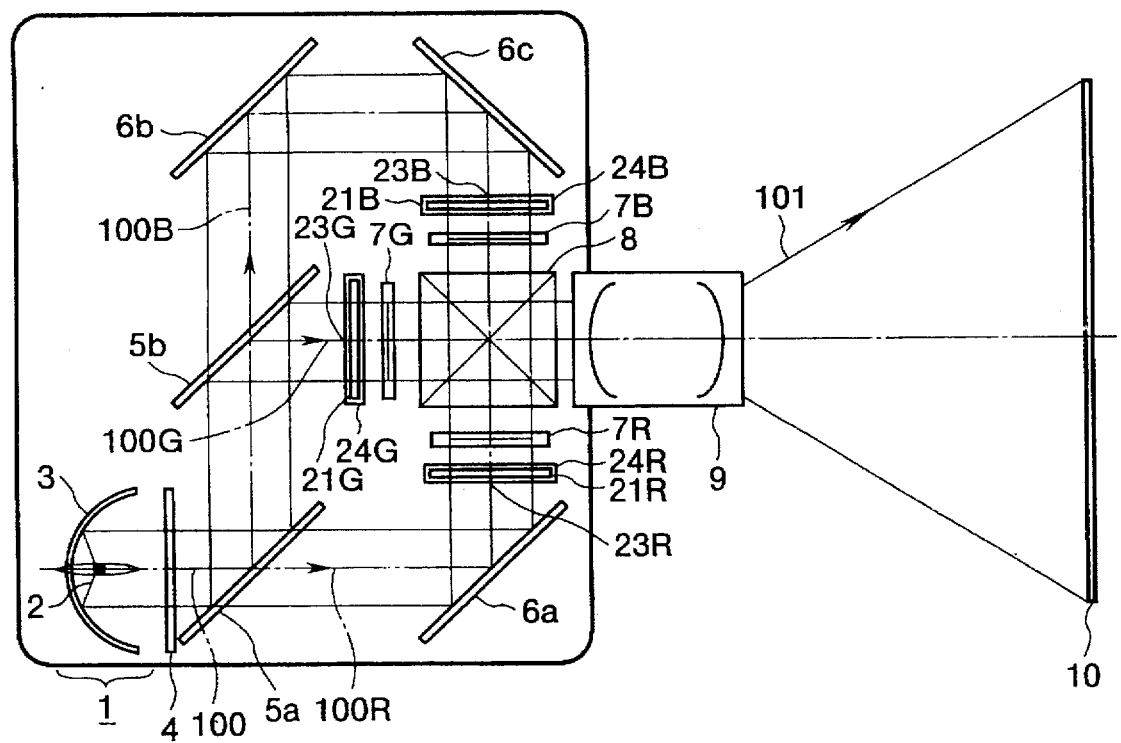
FIG. 12 illustrates a projection type display apparatus according to a second embodiment.

FIG. 12 illustrates a projection type display apparatus according to a second embodiment. Referring to FIG. 12, rotation-adjusting mechanisms 24R, 24G, and 24B causes half-wave plates 21R, 21G, and 21B to rotate about rotational axes 23R, 23G, and 23B.

For example, the half-wave plate 21R is rotated about the axis 23R in such a direction that the angle $\alpha$ between the plane of vibration of P-polarization of the incident light and the plane including the optic axis of the half-wave plate 21R becomes greater than 0° ($\alpha \leq 45°$). Then, the spectrum passing through the polarizer 71R placed on the incident side have different proportions of two spectral components in accordance with the spectral properties of the first dichroic mirror 5a, i.e., a first component resulting from the spectral property of the first dichroic mirror 5a that acts on the P-polarized component and a second component resulting from the spectral property that acts on the the S-polarized component.

Figure 13:
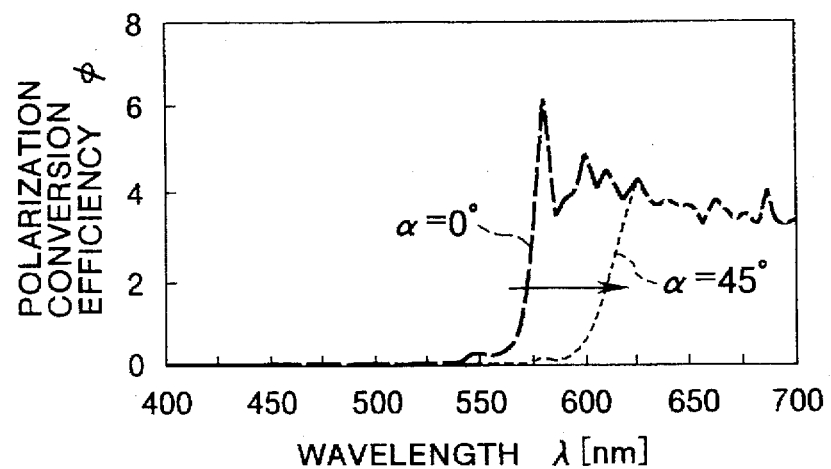
FIG. 13 illustrates changes in the optical spectrum that passes through the liquid crystal light valve for red light when the angle α between the plane of vibration of the P-polarization and the plane including the optic axis of the half-wave plate is changed.

FIG. 13 illustrates changes in the optical spectrum that passes through the liquid crystal light valve 7R for red when the angle $\alpha$ between the plane of vibration of the P-polarization and the plane including the optic axis is changed. The S-polarized component is more than the P-polarized component as the angle $\alpha$ increases from 0° as shown in FIG. 14 and the red light becomes progressively more saturated, hence improved color purity, accordingly.

Figure 14:
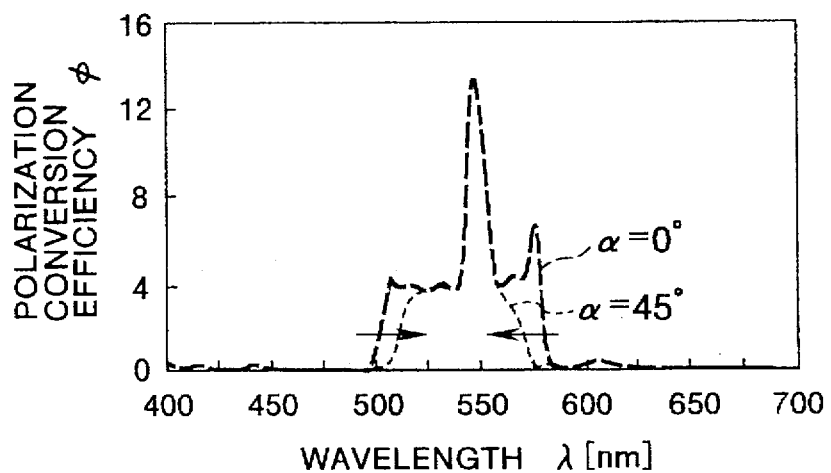
FIG. 14 shows changes in the optical spectrum that passes through the liquid crystal light valve for green light when the angle α between the plane of vibration of the S-polarization and the optic axis of the half-wave plate is changed.

FIG. 14 shows changes in the optical spectrum that passes through the liquid crystal light valve 7G for green when the angle $\alpha$ between the plane of vibration of the S-polarization and the plane including the optic axis of the half-wave plate is changed. For the light path of green, the P-polarized component is more than the S-polarized component as the angle $\alpha$ increases from 0° as shown in FIG. 14 and the green light becomes progressively more saturated, hence improved color purity, accordingly.

Figure 15:
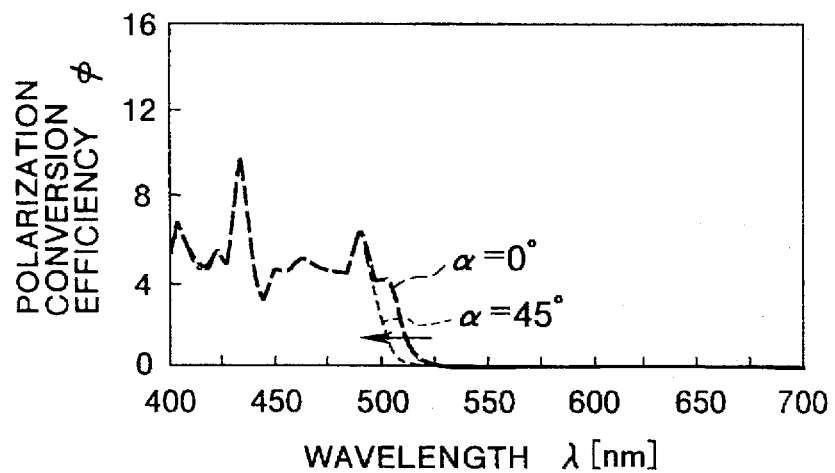
FIG. 15 shows changes in the optical spectrum that passes through the liquid crystal light valve for blue light when the angle α between the plane of vibration of P-polarization and the plane including the optic axis of the half-wave plate is changed.

FIG. 15 shows changes in the optical spectrum that passes through the liquid crystal light valve 7B for blue when the angle $\alpha$ between the plane of vibration of P-polarization and the plane including the optic axis is changed. For the light path of blue, the S-polarized component is more than the P-polarized component as the angle $\alpha$ increases from 0°. Therefore, the blue light becomes progressively more saturated as shown in FIG. 14, hence improved color purity.

Referring to FIG. 13 again, when the half-wave plate 21R is further rotated about the rotational axis 23R such that the angle $\alpha$ ($\alpha \leq 90°$) between the plane including the optic axis 22R and the plane of vibration of the P-polarization is larger than 45°, the P-polarized component becomes more than the S-polarized component, so that the red light becomes progressively less saturated returning back to the initial condition ($\alpha = 0°$) when the angle $\alpha$ reaches 90°. The above mentioned conditions appear four times if the half-wave plate 21R is rotated through 360° about the rotational axis 23R. Thus, if the rotation-adjusting mechanism 24R is capable of rotating the half-wave plate 21R through more than one-eighth of a complete rotation, the red light can be adjusted to the greatest extent and therefore to desired shades regardless of the variations in spectral properties of the lamp 2 and dichroic mirror 5.

As mentioned above, the spectral property of the light passing through the polarizers placed on the incident side of the respective liquid crystal light valves can be varied to adjust the chromaticity of the monochromatic projection light by rotating the corresponding half-wave plate (21R, 21G, or 21B) about the rotational axis (23R, 23G, or 23B). In addition, the proportion of the luminous flux of three colors i.e., red, green, and blue may be varied and therefore setting different proportions allow fine adjustment of white balance.

Figure 16:
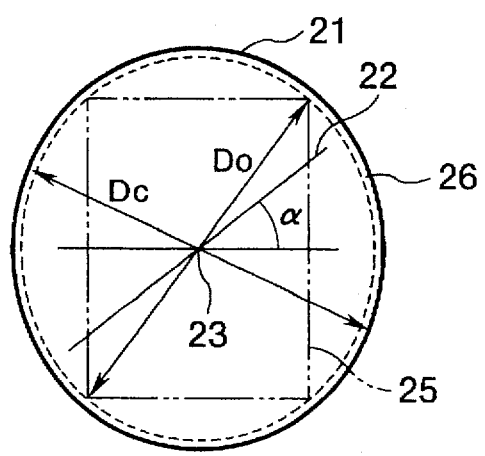
FIG. 16 shows the principle of operation of a circular half-wave plate.

It is desirable that the half-wave plate 21 is circular, because it is rotated about the rotational axis 23. FIG. 16 shows the principle of operation of a circular half-wave plate. Referring to FIG. 16, reference 25 indicates an effective cross-sectional area of the light which passes through the half-wave plate 21 and illuminates the image-forming area of the liquid crystal light valve. The effective area 25 is inscribed in a circle 26. In order for the half-wave plate 21 to provide the effective area 25, the diameter Dc of the half-wave plate 21 should be equal to or larger than the diagonal dimension Do of the effective area, i.e., $$Dc \geq Do \tag{6}$$

and the size of the half-wave plate 21 can be minimized, when $$Dc = Do \tag{7}$$

Figure 17:
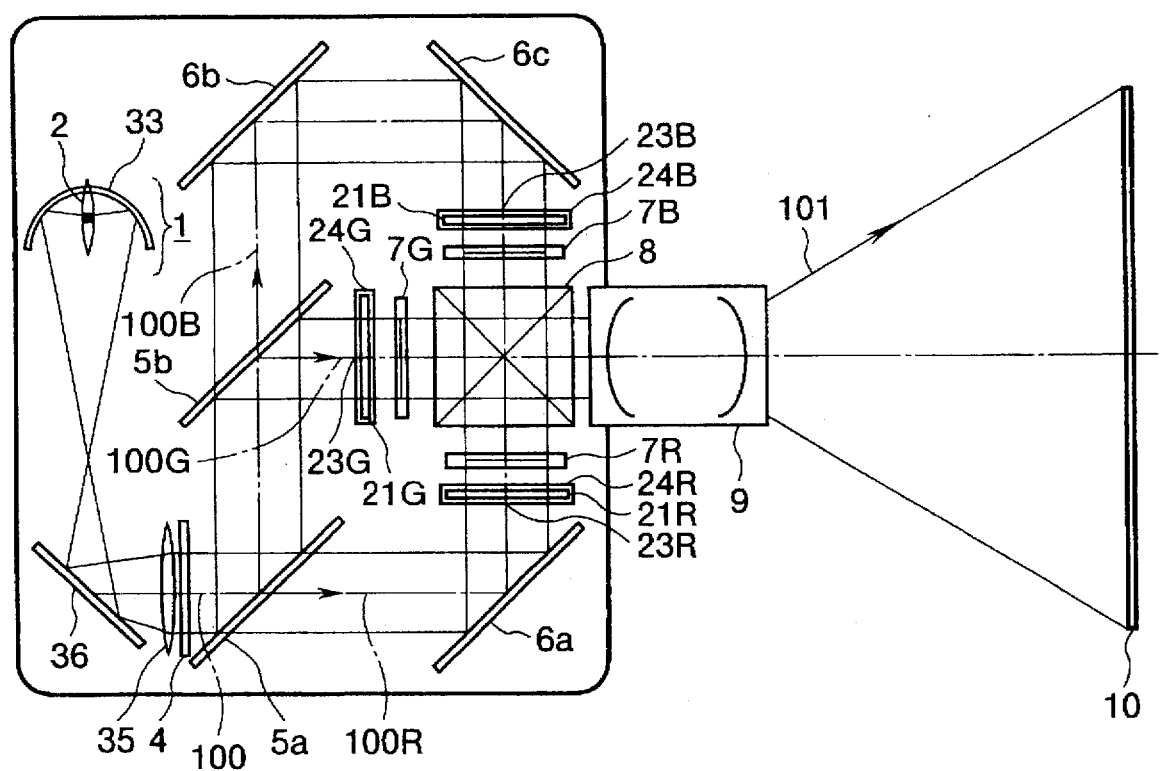
FIG. 17 shows an optical system in which a light source has an elliptical mirror 33 combined with the collimator lens.
Figure 18:
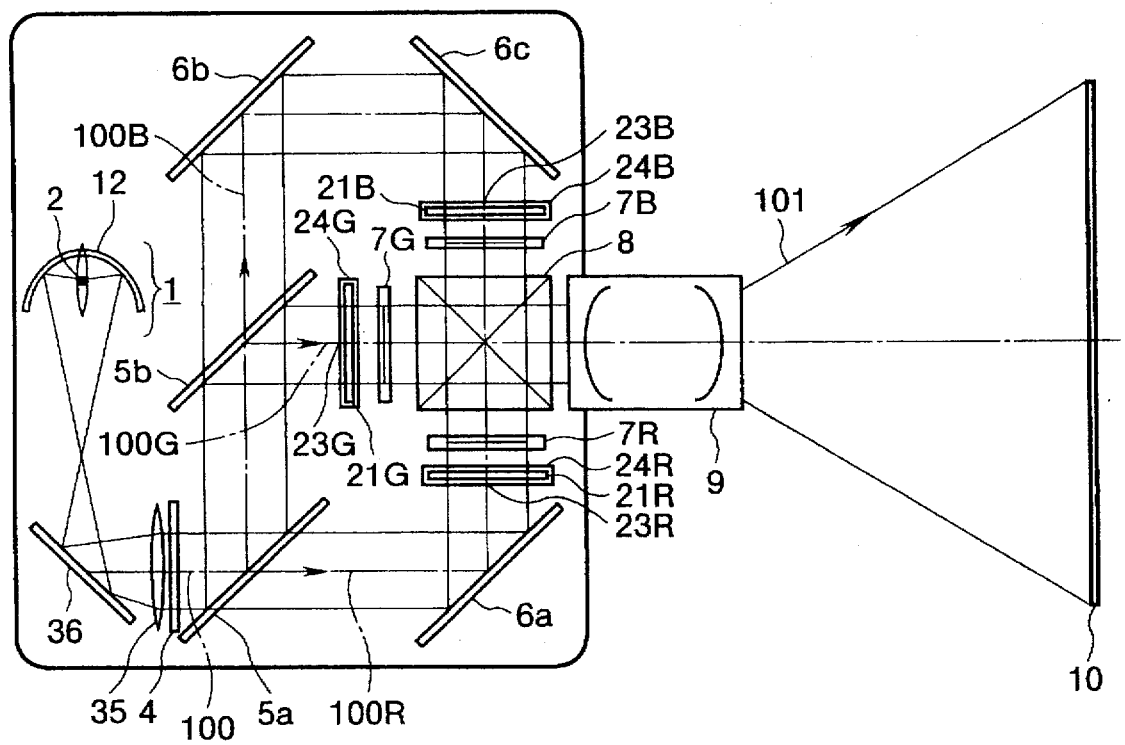
FIG. 18 shows an optical system in which a light source has the orthogonal parabolic reflector (OPR) 12 combined with the collimator lens.

The second embodiment provides a projection type display apparatus where color reproducibility of the projection light can be adjusted at will by rotating the half-wave plate placed in the light path. As in the first embodiment, the second embodiment can be applied to the optical system as shown in FIG. 17 in which a light source has an elliptical mirror combined with the collimator lens, and to an optical system as shown in FIG. 18 in which a light source has the orthogonal parabolic reflector (OPR) combined with the collimator lens.

Third embodiment

Figure 19:
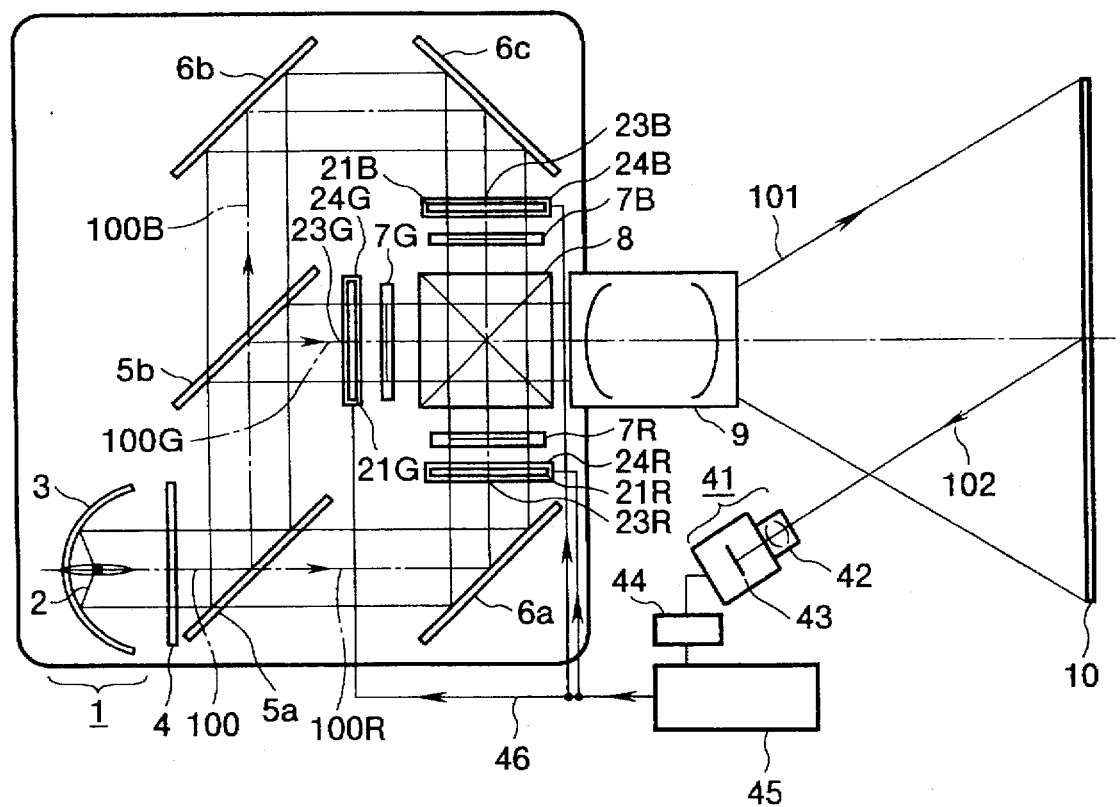
FIG. 19 illustrates a projection type display apparatus according to a third embodiment.

FIG. 19 illustrates a projection type display apparatus according to a third embodiment.

A chromaticity detector 41 primarily includes a shooting lens 42 and color sensor 43. The color sensor 43 incorporates a spectral sensitivity correcting filter, not shown, which has been previously aligned to have spectral sensitivities to three spectral stimulus values defined by the CIE (International Commission on Illumination). When any one of the monochromatic lights (i.e., red, green, blue) illuminates the screen 10, the chromaticity detector 41 receives a part of the projected image, for example, a central area of the image as a detected light 102. Then, the chromaticity detector 41 performs photoelectric conversion of the detected light 102 to calculate three spectral stimulus values and outputs the calculated values to a chromaticity control circuit 45. The desired values of chromaticity for red, green, and blue has been previously stored in the memory of the chromaticity control circuit 45. The chromaticity control circuit 45 sends control signals over signal lines 46 to the rotation-adjusting mechanisms 24R, 24G, and 24B which in turn control the half-wave plates 21R, 21G, and 21B to rotate about the rotational axes 23R, 23G, and 23B, respectively in accordance with the control signals.

The third embodiment maintains the same chromaticity of the respective monochromatic light, i.e., red, green and blue regardless of changes in spectrum emitted from the lamp 2, so that the projected light has a stable color reproducibility.

Figure 20:
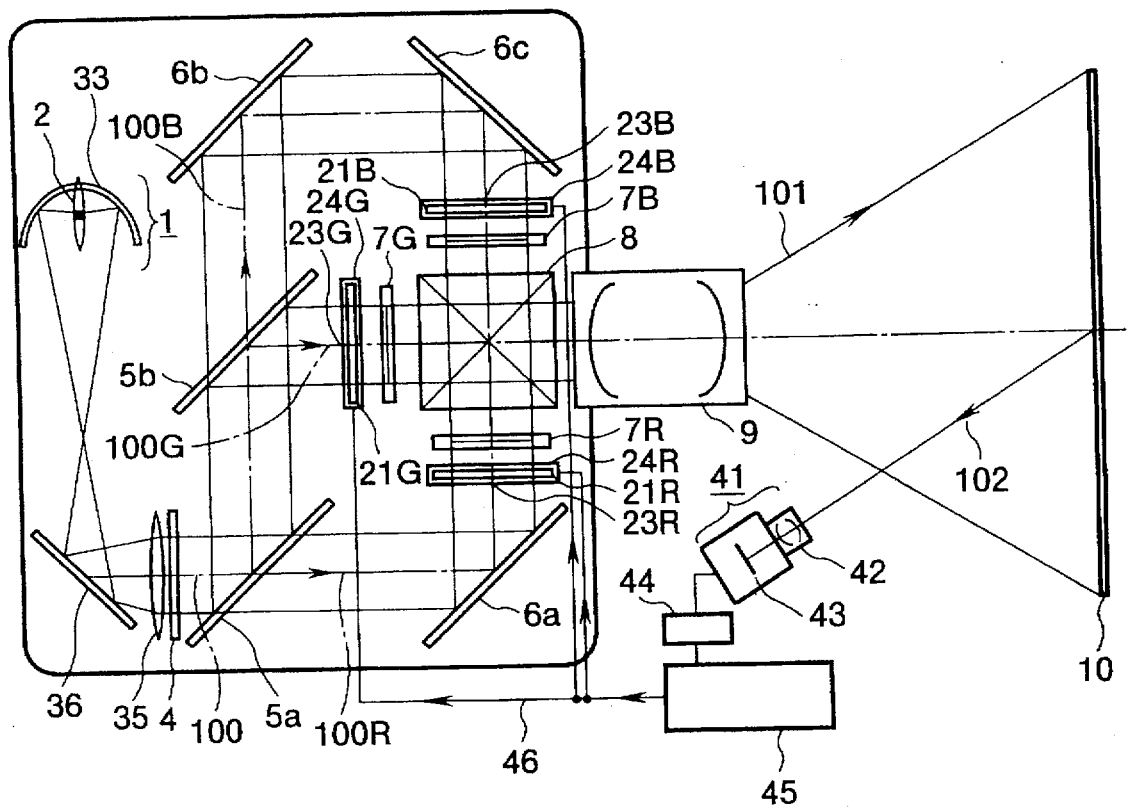
FIG. 20 shows an optical system in which a light source 1 has an elliptical mirror 33 combined with a collimator lens 35.
Figure 21:
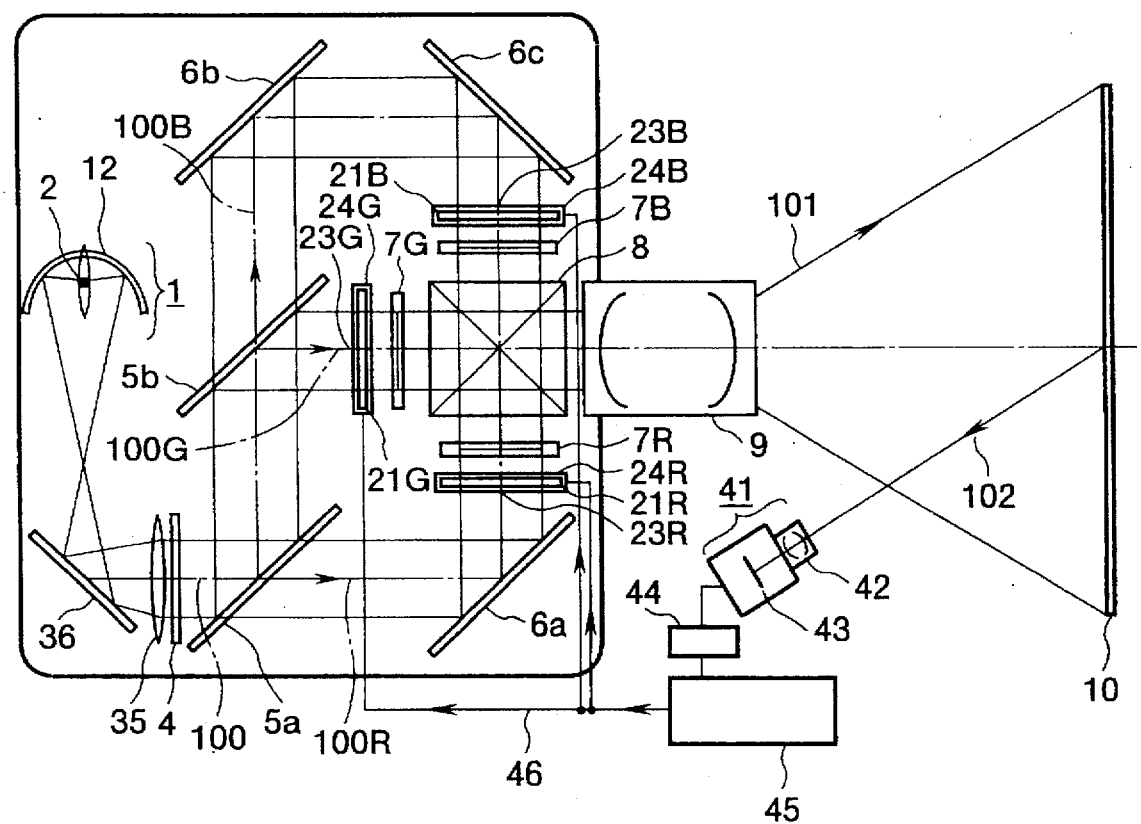
FIG. 21 shows an optical system in which a light source 1 has an orthogonal parabolic reflector (OPR) 12 combined with a collimator lens 35.

As in the second embodiment, the third embodiment may be applied to an optical system as shown in FIG. 20 in which a light source 1 has an elliptical mirror 33 combined with a collimator lens 35, and to an optical system as shown in FIG. 21 in which a light source 1 has an orthogonal parabolic reflector (OPR) 12 combined with a collimator lens 35.

Fourth embodiment

Figure 22A:
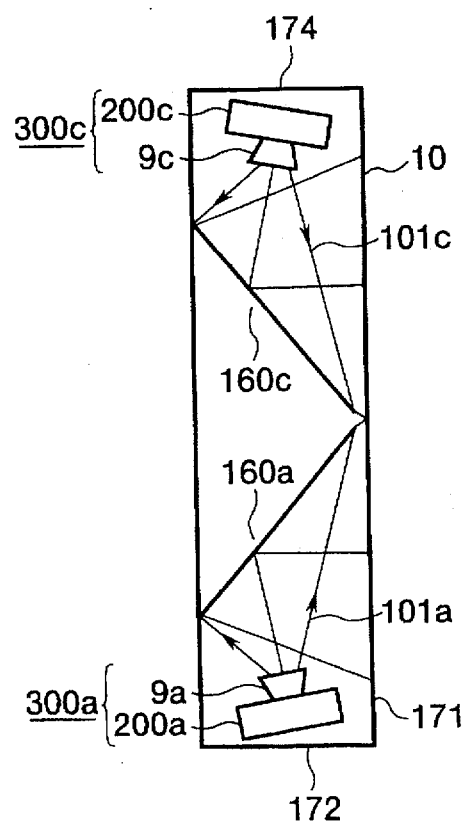
FIG. 22A shows a side view of a projection type display apparatus according to a fourth embodiment.
Figure 22B:
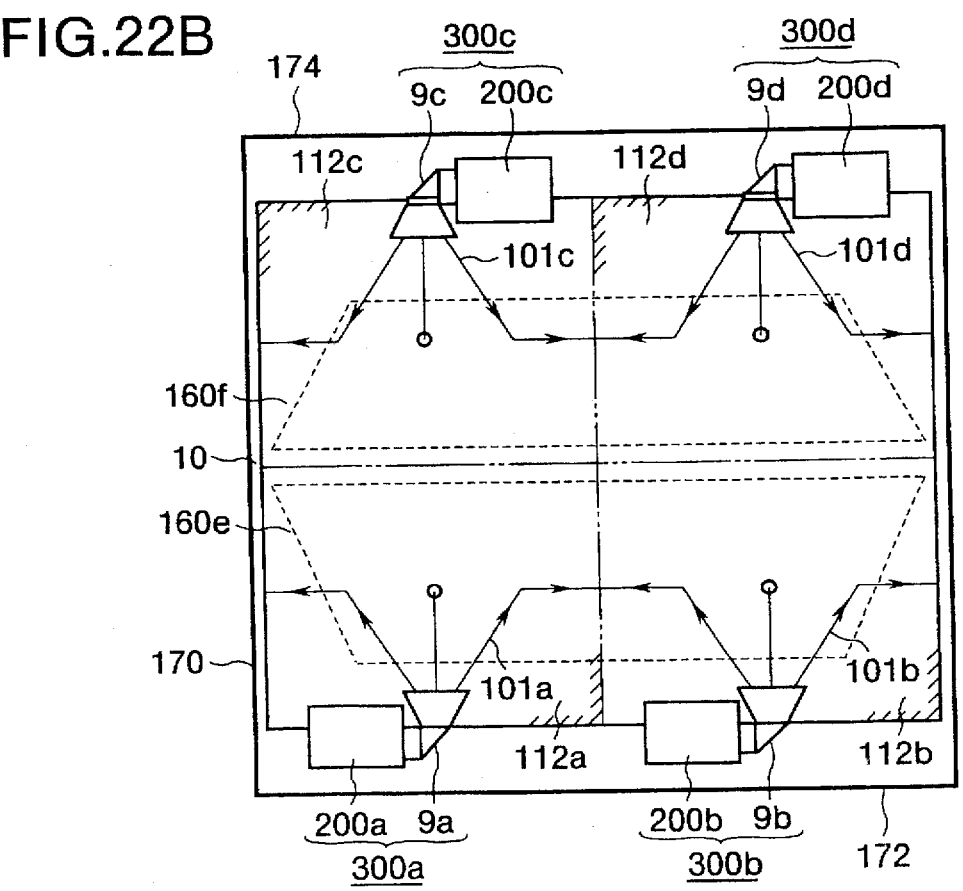
FIG. 22B shows a front view of the apparatus shown in FIG. 22A.

FIG. 22A shows a side view of a projection type display apparatus according to a fourth embodiment and FIG. 22B shows a front view of the display apparatus shown in FIG. 22A. Referring to FIGS. 22A and 22B, projectors 300a–300d include chassis 200a–200d and projection lenses 9a–9d, respectively. As in the first embodiment, the respective projector includes an optical system such as those shown in FIGS. 1, 9, and 10.

The projectors 300a and 300b are disposed at the bottom of a cabinet 170 and project enlarged projection lights 101a and 101b to form screen segments 112a and 112b, respectively. The projectors 300c and 300d are disposed close to the ceiling of the cabinet 170 and project enlarged projection lights 101c and 101d to form screen segments 112c and 112d, respectively.

The projection lights 101a and 101b are emitted upward and are bent by bending mirrors 160a and 160b toward a screen 10 while the projection lights 101c and 101d are emitted downward and are bent by bending mirrors 160c and 160d toward the screen 10. In this manner, the projection lights 101a–101d form screen segments 112c–112d, respectively. Although the screen segments shown in FIG. 22B are arranged in 2-by-2 matrix form, the number of screen segments and arrangement thereof may be modified.

The bending mirrors 160a–160b may be replaced by a single laterally extending mirror 160e so that the projection lights 101a–101b are bent by the same mirror 160e. This arrangement simplifies the mounting operation of the bending mirror when assembling the mirror to the cabinet. Likewise, the bending mirrors 160c–160d may be replaced by a single laterally extending mirror 160f. The bending mirrors 160e and 160f may be of a shape other than a rectangle as far as all of the projection lights 101a–101d are properly reflected without losing any part of of them. For example, the bending mirrors 160e and 160f may be the shape of a trapezoid as depicted by dotted lines in FIG. 22B. The trapezoidal mirror has a less mirror area which is effective to miniaturization of the project type display apparatus. The screen 10 may be of a single structure or may be formed of two halves, i.e., upper and lower halves or left and right halves. The screen 10 may be constructed in such a way that individual screen segments 112a–112d are arranged in matrix form, i.e., two screen segments side by side and then two additional segments above the two screen segments placed side by side. The cabinet 170 may be of a single console construction or include four individual cabinets, two cabinets placed side by side and two additional cabinets placed on top of the cabinet placed side by side, each cabinet forming the corresponding screen segment. These four cabinets may be arranged in an integral construction.

Referring to FIG. 22B, the chassis 200a–200d are arranged on the left side of the vertical center lines of the screen segments 112a–112b and the chassis 200c–200d on the right side of the screen segments 112c–112d. Alternatively, the chassis 200a–200d may be arranged on the left and right side of the corresponding screen segments so that the chassis 200a–200d located are symmetrical with respect to the vertical center line of the screen 10.

Although, the projectors 300c–300d are arranged above the bending mirrors 160c–160d, the projectors 300c–300d may be arranged on a support, not shown, provided in a space immediately above the bending mirrors 160a–160b. In this case, the bending mirrors 160c–160d are arranged in parallel to the binding mirrors 160a–160b.

As mentioned above, the fourth embodiment provides the same chromaticity of monochromatic light of red, green, and blue in the respective screen segment even if emitted spectrum varies from lamp to lamp and the spectral property of the half-wave plate varies from lot to lot, thereby implementing a multivision projection type display apparatus in which there is substantially no difference in color reproducibility among the screen segments.

Fifth embodiment

A fifth embodiment differs from the fourth embodiment in that the projectors 300a–300d incorporate the optical systems such as those shown in FIGS. 12, 17, and 18 instead of the optical systems such as those shown in FIGS. 1, 9, and 10.

The operation of the fifth embodiment will be described with reference to FIGS. 12 and 22A–22B. The half-wave plates, not shown, in the projector 300a are rotated about the rotational axes, not shown, so that the desired chromaticity of the light 101a projected to the screen segment 112a is obtained. Likewise, the other half-wave plates, not shown, in the projectors 300b–300d are rotated in order to obtain the desired chromaticity of the images projected to the screen segments 112b–112d.

As mentioned above, the fifth embodiment provides a projection type display apparatus in which the color reproducibility can be set to a desired level by rotating the half-wave plates placed in the paths of red, green, and blue light, respectively, while ensuring that there is substantially no difference in color reproducibility among the screen segments.

Sixth embodiment

Figure 23A:
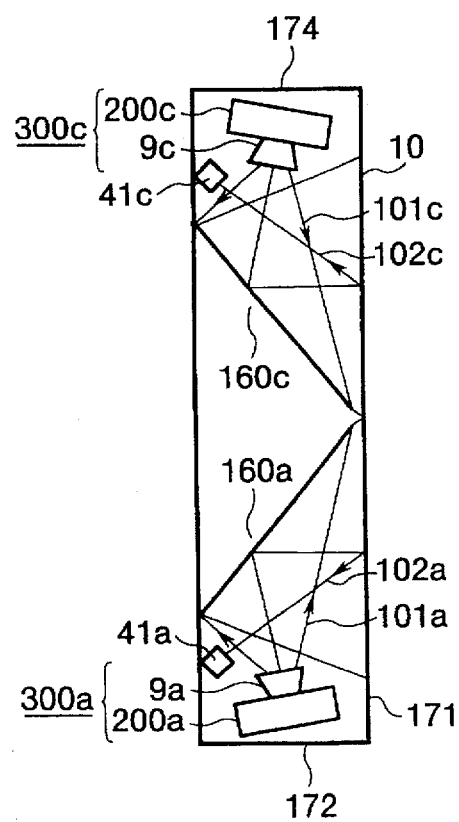
FIG. 23A illustrates a general construction of a projection type display apparatus according to a sixth embodiment.
Figure 23B:
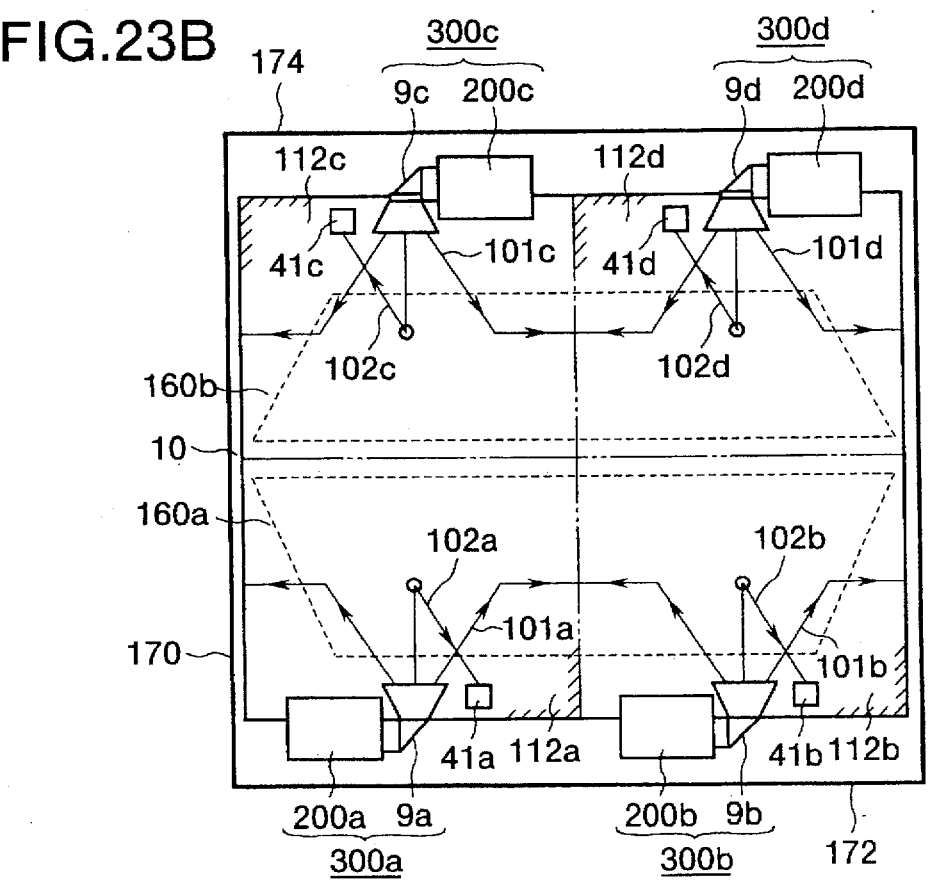
FIG. 23B shows a front view of the apparatus shown in FIG. 23A.
Figure 24:
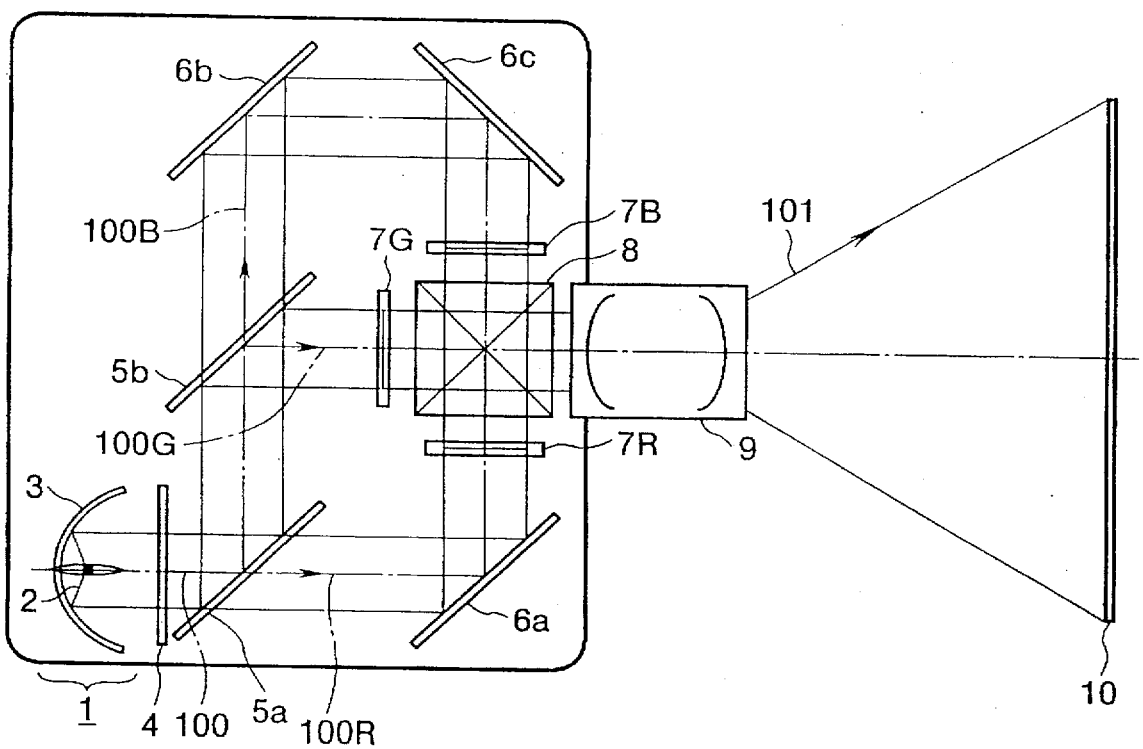
FIG. 24 illustrates an optical system for a projection type display apparatus using conventional light valves.

A sixth embodiment differs from the fifth embodiment in that the projectors 300a–300d incorporate the optical systems such as those shown in FIGS. 19, 20, and 21 instead of the optical systems such as those shown in FIGS. 12, 17, and 18. FIGS. 23A and 23B illustrate a general construction of a projection type display apparatus according to the sixth embodiment.

The operation of the sixth embodiment will be described with reference to FIGS. 23A and 23B. As in the third embodiment, the chromaticity detectors 41a–41d primarily include shooting lenses, not shown, and color sensors, not shown. The color sensor incorporates a spectral sensitivity correcting filter, not shown, which has previously been adjusted to have spectral sensitivity to three spectral stimuli defined by the CIE (International Commission on Illumination). When any one of the monochromatic light of red, green, and blue illuminates the screen 10, the chromaticity detector 41a (41b–41d) receives part of the projected image, for example, a central area of the image as a detected light 102a (102b–102d). The chromaticity detector 41a (41b–41d) performs photoelectric conversion of the detected light to calculate three stimuli and outputs the calculated values to a chromaticity control circuit, not shown. The values of desired chromaticity of red, green, and blue have been previously stored in the memory of the chromaticity control circuit, not shown. The chromaticity control circuit sends control signals over signal lines, not shown, to the rotation-adjusting mechanisms, not shown so as to control the half-wave plates 21R, 21G, and 21B in the respective projectors 300a–300d to rotate about the rotational axes 23R, 23G, and 23B, respectively. The rotation-adjusting mechanism is the same as that shown in FIG. 19.

While the chromaticity detectors are arranged for the corresponding screen segments in the sixth embodiment, the display apparatus may be modified so that a single chromaticity detector is shared by all the screen segments.

The sixth embodiment provides a multivision projection type display apparatus in which the same chromaticity can be maintained for red, green, and blue even if the emission spectrum of the lamp changes over time and there is substantially no difference in color reproducibility among the screen segments.

The present invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A projection type display apparatus, comprising:
   a light source emitting light;
   a color separator separating the light emitted from said light source into light of three primary colors;
   a plurality of light valves, each light valve receiving light of one of the three primary colors from said color separator to form a color image;
   a color synthesizer synthesizing the color images from said plurality of light valves into a single full-color image;
   a projection lens which enlarges and projects the single full-color image resulting from said color synthesizer; and
   a half-wave plate placed in at least one path of the light resulting from said color separator, said half-wave plate causing the plane of vibration of the light passing therethrough to rotate a predetermined angle,
   wherein said half-wave plate is of a disc shape having a diameter and a rectangular effective area through which the light passes to illuminate one of said plurality of light valves, the effective area having a diagonal dimension, and the diameter being equal to or greater than the diagonal dimension.

2. The projection type display apparatus according to claim 1, wherein said half-wave plate has a light incident surface and a light exiting surface, the surfaces having a coating of non-reflecting material thereon.

3. A projection type display apparatus according to claim 1, further including an adjusting mechanism causing said half-wave plate to rotate through an angle, wherein said half-wave plate has an optic axis, a light incident surface, and a light exiting surface, said half-wave plate being rotated about a rotational axis which is normal to the light incident surface and passes through the optic axis.

4. A projection type display system incorporating a plurality of projection type display apparatuses according to claim 1 each of which projects a corresponding image, the system further comprising:
   a rear projection type screen, and wherein said apparatuses are arranged in matrix form so as to form a multivision projection type display apparatus.

5. The projection type display system according to claim 4, further including:

a chromaticity detector for detecting chromaticity of an image projected on a corresponding screen segment and outputting a detection signal; and a controller for controlling said half-wave plate to rotate through an angle in accordance with the detection signal so that there is substantially no difference in detection signal between chromaticity detectors.

6. A projection type display system incorporating a plurality of projection type display apparatuses according to claim 1 each of which projects a corresponding image and includes an adjusting mechanism for causing said half-wave plate to rotate through an angle, wherein said half-wave plate has an optic axis and a light incident surface, said half-wave plate being rotated about a rotational axis which is normal to the light incident surface and passes through the optic axis, and wherein said apparatuses are arranged in matrix form so as to form a multivision projection type display apparatus.

7. The apparatus according to claim 11, wherein three light valves are provided, one for each of the three primary colors, and a half-wave plate is provided on the light incident side of each of said three light valves.

8. The apparatus according to claim 1, wherein said light source includes an orthogonal parabolic reflector.

9. The apparatus according to claim 1, wherein said light source includes an elliptical mirror.

10. A projection type display apparatus comprising:

a light source emitting light;

a color separator separating the light emitted from said light source into light of three primary colors;

a plurality of light valves, each light valve receiving light of one of the three primary colors from said color separator to form a color image;

a color synthesizer synthesizing the color images from said plurality of light valves into a single full-color image;

a projection lens which enlarges and projects the single full-color image resulting from said color synthesizer; and a half-wave plate placed in at least one path of the light resulting from said color separator, said half-wave plate causing the plane of vibration of the light passing therethrough to rotate a predetermined angle;

a chromaticity detector for detecting chromaticity of an image projected on a screen and outputting a detection signal; and a controller for controlling said half-wave plate to rotate though an angle in accordance with the detection signal.

11. The apparatus according to claim 10, wherein said half-wave plate has a light incident surface and a light exiting surface, each surface having a coating of non-reflecting material thereon.

12. The apparatus according to claim 10, further comprising:

an adjusting mechanism causing said half-wave plate to rotate though an angle, wherein said half-wave plate has an optic axis, a light incident surface, and a light exiting surface, said half-wave plate being rotated about a rotational axis which is normal to the light incident surface and passes through the optic axis.

13. The apparatus according to claim 10, wherein said half-wave plate is disc shaped having a diameter and a rectangular effective area through which the light passes to illuminate one of said plurality of light valves, the effective area having a diagonal dimension, and the diameter being equal to or greater than the diagonal dimension.

14. A projection type display system incorporating a plurality of projection type display apparatuses according to claim 10, each of which projects a corresponding image, the system further comprising:

a rear projection type screen, and wherein said apparatuses are arranged in matrix form so as to form a multivision projection type display apparatus.

15. The apparatus according to claim 10, wherein three light valves are provided, one for each of the three primary colors, and a half-wave plate is provided on the light incident side of each of said three light valves.

16. The apparatus according to claim 10, further comprising:

a memory unit storing desired values of chromaticity for the three primary colors, these desired values being used by said controller for determining the angle of rotation for said half-wave plate.

17. The apparatus according to claim 10, wherein said light source includes an orthogonal parabolic reflector.

18. The apparatus according to claim 10, wherein said light source includes an elliptical mirror.

19. A projection type display system comprising:

(a) plurality of projection type display apparatuses arranged in a matrix to form a multivision projection type display apparatus, each of said plurality of projection type display apparatuses projecting a corresponding image and including;

(i) a light source emitting a substantially parallel illumination flux, (ii) color separator separating the substantially parallel illumination flux into light of three primary colors including red, green, and blue, (iii) a plurality of light valves, each of said light valves receiving light of a corresponding color to form a color image, (iv) a color synthesizer synthesizing the color images from said plurality of light valves into a single full-color image, (v) a projection lens which enlarges and projects the single full-color image formed by said color synthesizer, and (vi) a half-wave plate placed in at least one path of the light resulting from said color separator, said half-wave plate causing the plane of vibration of the light passing therethrough to rotate through a predetermined angle;

(b) a rear projection screen, a section of said screen receiving a full color image from one of said plurality of projection type display apparatuses;

(c) a chromaticity detector for detecting chromaticity of an image projected on a corresponding screen segment and outputting a detection signal; and (d) a controller for controlling said half-wave plate to rotate through an angle in accordance with the detection signal.

20. The projection type display system according to claim 19, wherein a chromaticity detector and controller are provided for each of said plurality of projection type display apparatuses, said controllers each controlling the half-wave plate of a corresponding projection type display apparatus so that there is substantially no difference between the detection signals resulting from said chromaticity detectors.

* * * * *